US012718391B2

(12) United States Patent
Kadambi et al.

(10) Patent No.: US 12,718,391 B2
(45) Date of Patent: Aug. 25, 2026

(54) POLARIZED SEMI-GLOBAL MATCHING

(71) Applicant: Intrinsic Innovation LLC, Mountain View, CA (US)

(72) Inventors: Achuta Kadambi, Los Angeles, CA (US); Raghav Khanna, Zurich (CH); Agastya Kalra, Palo Alto, CA (US); Kerim Doruk Karinca, Mountain View, CA (US); Tomas Gerlich, Palo Alto, CA (US); Vage Taamazyan, Balashikha (RU)

(73) Assignee: Intrinsic Innovation LLC, Mountain View, CA (US)

( * ) Notice: Subject to any disclaimer, the term of this patent is extended or adjusted under 35 U.S.C. 154(b) by 303 days.

(21) Appl. No.: 18/395,090

(22) Filed: Dec. 22, 2023

(65) Prior Publication Data

US 2024/0221344 A1 Jul. 4, 2024

Related U.S. Application Data

(60) Provisional application No. 63/436,447, filed on Dec. 30, 2022.

(51) Int. Cl.
*G06T 7/593* (2017.01)

(52) U.S. Cl.
CPC .... *G06T 7/593* (2017.01); *G06T 2207/10141* (2013.01)

(58) Field of Classification Search
CPC .. G06T 7/50; G06T 7/55; G06T 7/593; G06T 7/596; G06T 2207/10012; G06T 2207/10021; G06T 2207/10141; H04N 13/239; H04N 2013/0081
See application file for complete search history.

(56) References Cited

U.S. PATENT DOCUMENTS

2020/0077011 A1* 3/2020 Haltmaier ............... G06T 7/521

OTHER PUBLICATIONS

Berger, Kai, Randolph Voorhies, and Larry H. Matthies. “Depth from stereo polarization in specular scenes for urban robotics.” 2017 IEEE international conference on robotics and automation (ICRA). IEEE, 2017. (Year: 2017).*

(Continued)

*Primary Examiner* — Geoffrey E Summers
(74) *Attorney, Agent, or Firm* — Fish & Richardson P.C.

(57) ABSTRACT

Methods, systems, and apparatus, including computer programs encoded on computer storage media, for detection of pixel correspondences in stereo imaging through the use of polarization data. One of the methods include: obtaining a first image from a first viewpoint of a stereo pair and a second image from a second viewpoint of the stereo pair; obtaining an angle of linear polarization (AOLP) map and a degree of linear polarization (DOLP) map having a field of view overlapping the first image and the second image; computing a surface normal map based on the AOLP map and the DOLP map; and detecting corresponding pixels between the first image and the second image by computing a disparity map that minimizes an energy function comprising a pixel matching cost term and a polarized smoothness regularization term computed based on pixels in a local neighborhood and based on the surface normal map.

20 Claims, 4 Drawing Sheets

(56) References Cited

OTHER PUBLICATIONS

Fukao, Yoshiki, et al. "Polarimetric Normal Stereo." 2021 IEEE/CVF Conference on Computer Vision and Pattern Recognition (CVPR). IEEE, 2021. (Year: 2021).*

Berger et al., "Incorporating Polarization in Stereo Vision-based 3-D Perception of Non-Lambertian Scenes," Paper, Presented at Proceedings of Society of Photo-Optical Instrumentation Engineers (SPIE) 9837, SPIE Defense + Security, 2016, Baltimore, MD, United States, Unmanned Systems Technology XVIII, 98370P, May 13, 2016, vol. 9837.

Hirschmuller et al., "Accurate and efficient stereo processing by semi-global matching and mutual information," Paper, Presented at Proceedings of the 2005 IEEE Computer Society Conference on Computer Vision and Pattern Recognition (CVPR'0S), San Diego, CA, USA, Jun. 20-26, 2005, IEEE Xplore, Jul. 25, 2005, 2:804-814.

Hirschmüller, "Semi-global matching-motivation, developments and applications," Paper, Presented at Proceedings of Photogrammetric Week 11, Stuttgart, Germany, Sep. 9-13, 2011, Photogrammetric Week 2011, pp. 173-184.

Hirschmuller, "Stereo Processing by Semiglobal Matching and Mutual Information," IEEE Transactions on pattern analysis and machine intelligence, Feb. 1, 2008, 30(2): 328-341.

* cited by examiner

POLARIZED SEMI-GLOBAL MATCHING

CROSS-REFERENCE TO RELATED APPLICATIONS

This application claims priority to U.S. Provisional Application No. 63/436,447, filed on Dec. 30, 2022. The disclosure of the prior application is considered part of and is incorporated by reference in the disclosure of this application.

FIELD

Aspects of embodiments of the present disclosure relate to the field of image processing and computer vision.

BACKGROUND

Detecting corresponding pixels in pairs of images is useful in computer vision for performing, for example, three-dimensional (3D) reconstruction of a scene. In this context, a first pixel in a first image and a second pixel in a second image are considered to be corresponding pixels when they depict the same point or portion of a real-world surface. As a concrete example, in a stereo pair of left and right images captured of a scene that includes a pencil, a first pixel in the left image depicting the tip of the pencil is said to correspond to a second pixel in the right image that also depicts the tip of the pencil.

Three-dimensional reconstruction can be performed using this stereo pair based on finding corresponding pixels between the first and second scene and through triangulation. This technique is related to depth perception by humans using stereo vision and binocular disparity or parallax, where the two eyes provide different views on a scene. Closer objects exhibit greater parallax shift than distant objects, hence the distance to (or depth of) an object is inferred based on the degree of parallax shift between the views provided by the two eyes. In a similar manner, detecting the disparity in corresponding pixels between images captured by a stereo pair of cameras provides a computer vision system with a manner for detecting the depth of an object or a surface in a scene imaged by the stereo pair.

SUMMARY

This specification describes a system implemented by one or more computers that improves the detection of pixel correspondences in stereo imaging through the use of polarization data. Leveraging polarization, the system can more accurately detect correspondences, e.g., in terms of disparities, between pixels in a first image and pixels in a second image in a pair of stereo images.

Particular embodiments of the subject matter described in this specification can be implemented so as to realize one or more of the following advantages.

Given a pair of polarized stereo images, the techniques described in this specification can more accurately detect pixel correspondences between the two images in the pair by considering polarization cues. By way of example, considering polarization cues can improve the accuracy of detected pixel correspondence for non-fronto-parallel scenes as well as the robustness of the detected pixel correspondence to noise. A computer vision system implementing the techniques described in this specification can more reliably generate a three-dimensional reconstruction or another digital representation of a scene in an environment from polarized stereo images, while being easily configurable to additionally generate outputs for a variety of perception tasks, e.g., object detection and/or classification, pose estimation, semantic segmentation, image reconstruction, and the like. As a result, improved performance of robots on various tasks can thus be achieved by virtue of the quality improvement in the vision data that includes such 3-D reconstructions and/or perception task outputs to be processed by a control system of the robots when controlling the robots.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a system implemented by one or more computers that receives a pair of polarized stereo images and generates a disparity map for a first polarized stereo image and a second polarized stereo image in the pair. The disparity map can then be used for a variety of purposes or applications. In some examples, the disparity map can be used to find the correspondence between pixels in the first image and the second image in the pair; the disparity map can be used to estimate a depth map of an environment; the disparity map can also be used to reconstruct a three-dimensional (3-D) scene of the environment.

Stereo camera systems are one subset of digital camera devices for capturing 3-D content. Stereo camera systems capture images of a scene from two or more camera modules that may be spaced apart from each other along a baseline. The baseline is typically horizontal, similar to binocular vision in a human, such that images captured by a stereo pair are often referred to as a left image and right image. However, stereo camera systems are not limited thereto and the baseline may be oriented vertically or along any other direction.

Some stereo camera systems are polarized stereo camera systems. Each camera module in a polarized stereo camera may include a polarizer or polarizing filter or polarization mask placed in the optical path between a scene and an image sensor of the camera module. Polarization imaging provides significant additional information about the scene that would not otherwise be available using a standard camera system (i.e., a camera system lacking a polarizing filter). As one example, shape from polarization (SfP) provides techniques for using polarization signatures to compute the surface normals (e.g., the directions in which surfaces of objects are facing) using the Fresnel equations. Some commercially available sensors, such as the IMX250MZR polarization image sensor available from Sony® Corporation, are examples of the polarized stereo camera systems.

Figure 1:
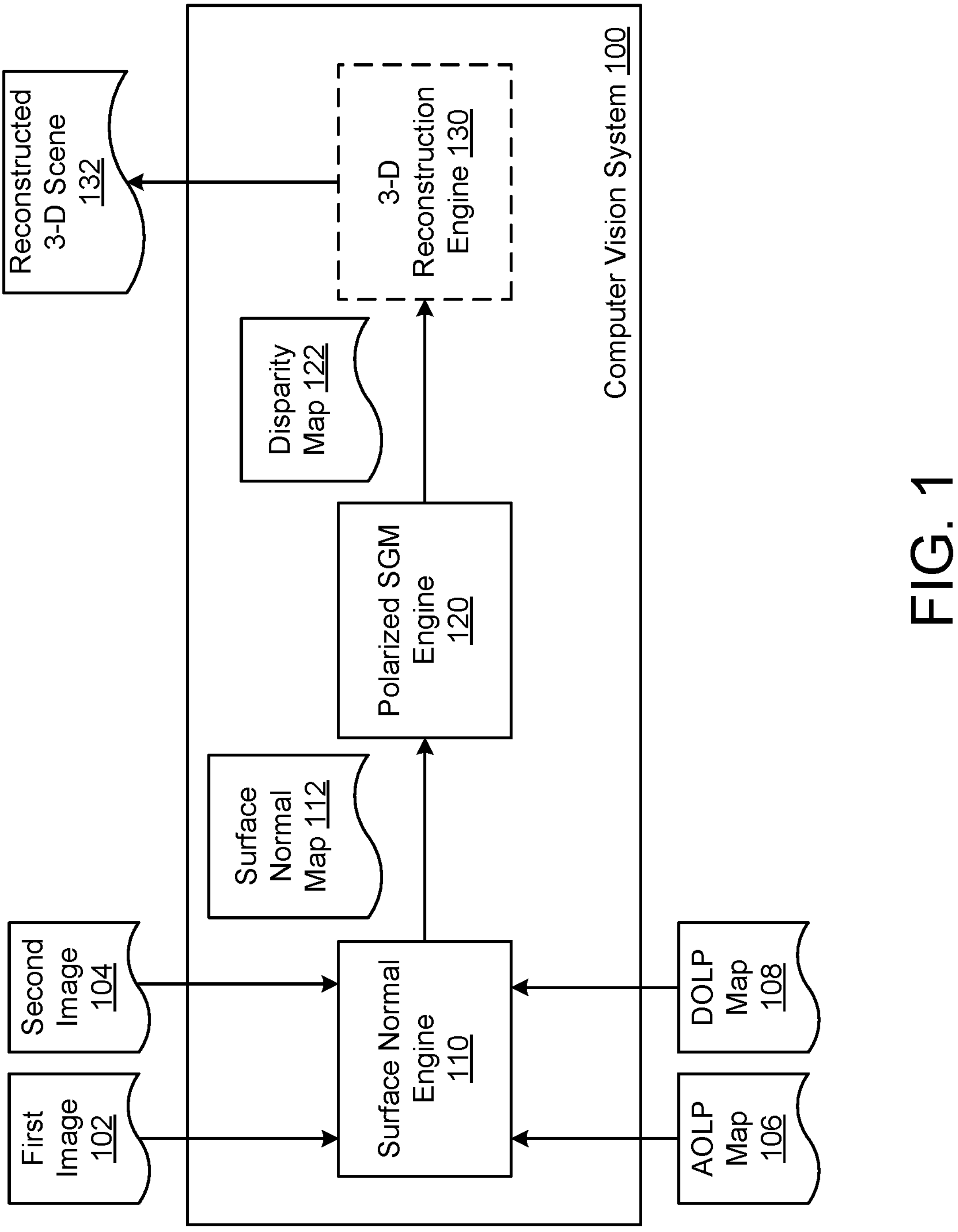
FIG. 1 shows an example computer vision system.

FIG. 1 shows an example computer vision system 100. The computer vision system 100 is an example of a system implemented as computer programs on one or more computers in one or more locations, in which the systems, components, and techniques described below can be implemented.

The computer vision system 100 obtains a first polarized stereo image 102 and a second polarized stereo image 104 and generates a disparity map 122 for the images 102 and 104 in the pair by using polarization cues. The first polarized stereo image 102 and a second polarized stereo image 104 may be taken from slightly different viewpoints by a polarized stereo camera system. In some cases, each polarized stereo image is composed of multiple (e.g., three or more) polarization raw frames captured by the polarized stereo camera system that has differently oriented polarizing filters in their optical paths. That is, the multiple polarization raw frames corresponding to the polarized stereo image are captured of a same scene with polarizing filters set at different angles of linear polarization (e.g., 0°, 60°, and 120°; or 0°, 45°, 90°, and 135°).

The computer vision system 100 can obtain the images 102 and 104 from the polarized stereo camera system in any of a variety of ways. In some cases, the computer vision system 100 and the polarized stereo camera system may both be part of the same stand-alone system (that is, a self-contained device capable of operating without further hardware). For example, an FPGA or other processor may be integrated as an embedded device into a virtual-reality headset or robot equipped with a polarized stereo camera. Similarly, a laptop, tablet, smart phone, or other personal computing device may have an embedded polarized stereo camera. In these cases, an internal device bus or another interface/connector may transport the camera output signals from the camera(s) to the processor(s) of the stand-alone system. In some other cases, the computer vision system 100 may be provided as one or more devices separate from the polarized stereo camera system, and the image data may be transmitted via a wired or wireless communication link. For example, a polarized stereo camera system may send its camera output signals via a cable (e.g., a USB cable or an Ethernet cable) or via Bluetooth to a nearby (e.g., desktop, laptop, or tablet) computer. As another example, polarized stereo image pairs may be uploaded from the polarized stereo camera system to the Internet, from which the computer vision system 100 may download them via a wired or wireless network connection.

The computer vision system 100 also obtains one or more angle of linear polarization (AOLP) maps 106 and one or more degree of linear polarization (DOLP) maps 108. As used in this specification, an AOLP (or DOLP) map refers to a digital representation of features of an image in a polarization representation space. In some cases, the computer vision system 100 can similarly obtain the AOLP map(s) 106 and the DOLP map(s) 108 from the polarized stereo camera system, e.g., as metadata that accompanies the first and second images 102 and 104, while in other cases, the computer vision system 100 can receive the AOLP map(s) 106 and the DOLP(s) map 108 from a different source, e.g., from a polarization signature computation engine that may be implemented either local to or remote from the computer vision system 100.

The AOLP map(s) 106 and the DOLP map(s) 108 may each have a field of view overlapping the fields of view of the first polarized stereo image 102 and the second polarized stereo image 104. For example, the computer vision system 100 can obtain a first AOLP map and a first DOLP map that are computed from the viewpoint of the first polarized stereo image 102, and can additionally or alternatively obtain a second AOLP map and a second DOLP map that are computed from the viewpoint of the second polarized stereo image 104.

Angle of linear polarization (AOLP) and degree of linear polarization (DOLP), which describe the physical information of polarization, may be defined in terms of Stokes parameters. The Stokes parameters are a set of values that describe the polarization state of electromagnetic radiation well-known in physics. The Stokes parameters I, Q, U, and/or V may be determined from measurements of the scattered light, where I is the total radiance of light, Q and U describe linearly polarized radiation, and V describes the circularly polarized radiation. The degree of linear polarization (DOLP) indicates the ratio of the intensity of the polarized to the intensity of the unpolarized part of a light ray hitting the image sensor of a camera module. The angle of linear polarization (AOLP) indicates the direction of that linear polarization.

A surface normal engine 110 of the computer vision system 100 uses the polarization features represented by the AOLP map(s) 106 and the DOLP map(s) 108 and, optionally, additional feature information extracted from the images 102 and 104 to generate a surface normal map 112. The surface normal engine 110 can for example compute the surface normals from the polarization features by using the Fresnel equations. The surface normal map 112 is a digital representation that indicates the directions in which surfaces of objects in an image are facing. For example, the surface normal map 112 may include, for each of one or more pixels in the first polarized stereo image 102 or the second polarized stereo image 104, the coordinates of the surface normal, or vector which is perpendicular to the surface. Because the AOLP map(s) 106 and the DOLP map(s) 108 provide additional polarization feature information such as information about the object plane (surface normal) that reflects the incoming light, using the AOLP map(s) and the DOLP map(s) to generate the surface normals is generally more accurate than interpolating such normal vectors merely from images.

From (i) the first image 102 and the second image 104, (ii) the AOLP map 106 and the DOLP map 108, (iii) the surface normal map 112, or some combinations of (i)-(iii), the computer vision system 100 uses a polarized semi-global matching (SGM) engine 120 to generate a disparity map 122. The disparity map 122 is a digital representation that indicates a disparity between the first polarized stereo image 102 and the second polarized stereo image 104. Disparity refers to the difference in location (e.g., horizontal coordinates) of corresponding pixels in a pair of images. In other words, disparity indicates the displacement of a pixel (or pixel block) in the second image with respect to its location in the first image. For example, the disparity map 122 may indicate a horizontal offset between pixels of the first image 102 and pixels of the second image 104. The disparity map 122 may be stored in known graphics formats, such as GIF or TIFF format.

As traditional computer vision algorithms for estimation of a disparity map based on two input images captured by a rectified stereo image pair (e.g., a vertically aligned stereo image pair), semi-global matching (SGM) and its improvements are described in more detail in Hirschmuller, Heiko. "Accurate and efficient stereo processing by semi-global matching and mutual information." 2005 *IEEE Computer Society Conference on Computer Vision and Pattern Recognition* (*CVPR*'05). Vol. 2. IEEE, 2005, in Hirschmuller, Heiko. "Stereo processing by semiglobal matching and mutual information." *IEEE Transactions on pattern analysis and machine intelligence* 30.2 (2007): 328-341, and in Hirschmüller, Heiko. "Semi-global matching-motivation, developments and applications." *Photogrammetric Week* 11 (2011): 173-184.

In standard semi-global matching (SGM), a disparity map D 122 is computed by minimizing an objective function (or energy function) composed of a pixel matching cost term $C_p(d_p)$ and a smoothness regularization term $R(p, d_p, q, d_q)$, as in the form below:

$$E(D) = \sum_p C_p(d_p) + \sum_{p,q \in N} R(p, d_p, q, d_q),$$

where $C_p(d_p)$ is the pixel matching cost term at pixel p with disparity $d_p$ and $R(p, d_p, q, d_q)$ is the smoothness regularization term that penalizes disparity differences between adjacent pixels in a neighborhood. As will be explained below, standard SGM is not well adapted for stereo matching that involves non-fronto-parallel scenes due to the implementation of this smoothness regularization term.

In principle the pixel matching cost term $C_p(d_p)$ can use any pixel-wise dissimilarity measure, e.g., the absolute or squared difference between intensity values and/or color values, Birchfield-Tomasi dissimilarity, Hamming distance of the census transform, or the like. Given a rectified stereo image pair, for a pixel p with coordinates (x, y) in a first image, the set of pixel candidates q in a second image is usually selected within a neighborhood (a subset) in the second image. For example, the set of pixel candidates q with coordinates (x', y) may be selected as $\{(x', y)|x' \geq x, x' \leq x+d\}$, where d refers to the maximum allowed disparity (or displacement) level that defines the neighborhood. The pixel matching cost term $C_p(d_p)$ for d disparity levels at a given pixel p, in the first image may then be determined by computing such a pixel-wise dissimilarity measure with (x to x+d) pixel coordinates in the second image.

The smoothness regularization term which has the form as below $$R(p, d_p, q, d_q) = \begin{cases} 0 & \text{if } d_p = d_q \\ c_1 & \text{if } |d_p - d_q| = 1 \\ c_2 & \text{if } |d_p - d_q| \geq 1 \end{cases}$$

measures the regularization cost between pixels p and q with disparities $d_p$ and $d_q$ respectively, for all pairs of neighboring pixels N, where $c_1$ and $c_2$ are two constant parameters, with $c_1 < c_2$. The three-way comparison allows to assign a smaller penalty for unitary changes in disparity, thus allowing smooth transitions corresponding, e.g., to slanted surfaces, and penalizing larger jumps while preserving discontinuities due to the constant penalty term.

The implicit assumption made by the standard SGM or other area-based matching algorithms is that objects have fronto-parallel surfaces (i.e. depth is constant within the neighborhood). This assumption is violated by sloping surfaces and/or creased, dented, or otherwise buckled surfaces. Because the currently used smoothness regularization term does not account well for non-fronto-parallel scenes, these algorithms often produce less satisfactory results for scenes involving non-fronto-parallel surfaces. Non-fronto-parallel surfaces may result in "ghost match," i.e. a local match that is not consistent with a global solution of the stereo correspondence problem.

The polarized semi-global matching (SGM) engine 120 thus uses slope (or gradient) information captured from polarization to modify the energy function in standard SGM by adding another smoothness regularization term $R_{slope}$ to generate an augmented energy function that has the form below:

$$E(D) = \sum_p C_p(d_p) + \sum_{p,q \in N} R(p, d_p, q, d_q) + \sum_{p,q \in N} R_{slope}(p, d_p, q, d_q)$$

This smoothness regularization term $R_{slope}$ is dependent on the polarization cues and, in particular, the slopes of the surfaces in the scene, which can be computed from the polarization cues. The slopes of the surfaces can be computed with reference to surface normals (or a gradient map, because surface normals are the derivatives of 3-D shape), e.g., as the orientation of the surface normals defined in the surface normal map 112. Hence the smoothness regularization term $R_{slope}$ may also be referred to as the polarized smoothness regularization term. For example, the slopes can be computed by obtaining a surface normal. As another example, the slopes can be computed by differentiating the 3-D shape.

Unlike the smoothness regularization term used in standard SGM (which may be referred to as the unpolarized smoothness regularization term), which always penalizes jumps in disparity between adjacent pixels in a neighborhood, the smoothness regularization term $R_{slope}$ accommodates the jumps in disparity between adjacent pixels by taking into consideration the slope in the neighborhood, for example by adaptively computing a reduced regularization cost to account for the fact that a particular pixel is further away from the polarized stereo camera system than its neighboring pixels, e.g., when a real-world point corresponding to the particular pixel is located in a dent in the surface on which the other points corresponding to the neighboring pixels reside.

For example, the smoothness regularization term $R_{slope}$ can be evaluated as a least squares distance between $d_p$ and $d_p$ or a binary indicator function of $d_p$ and $d_p$.

As another example, when using a single polarization camera, the smoothness regularization term $R_{slope}$ can be evaluated as:

$$E_{pol,mono} = w_1|\sin(\alpha)\nabla_x d - \cos(\alpha)\nabla_y d| + w_2(\sin(\alpha)\nabla_x d - \cos(\alpha)\nabla_y d)^2,$$

where $w_1$ and $w_2$ are weighting factors, d is the stereo disparity, and $\alpha$ is surface azimuth angle.

As yet another example, when using a multiple polarization camera, the smoothness regularization term $R_{slope}$ can be evaluated by adding the following equation to the equation mentioned above with reference to the single polarization camera example:

$$E_{pol,stereo} = w_3(|\sin(\alpha_1) - \sin(\alpha_2)| + |\cos(\alpha_1) - \cos(\alpha_2)|),$$

where $\alpha_1$ and $\alpha_2$ are the surface azimuth angles (with respect to the same reference frame) given by the polarization camera images from 2 different points of view.

In some implementations, the polarized SGM engine 120 can compute the slopes to feed in to the smoothness regularization term $R_{slope}$ by computing a differentiation of the 3D shapes captured in the first image 102 and second image 104. In some implementations, the polarized SGM engine 120 can use shape from polarization (SfP) theory to compute the slopes to feed in to the smoothness regularization term $R_{slope}$. Suitable techniques for computing slopes by applying SfP to the AOLP map 106 and DOLP map 108 are described in U.S. Pat. No. 10,260,866 B2, the entire contents of which are hereby incorporated by reference herein in their entirety. In some implementations, the polarized SGM engine 120 can use machine learning techniques to compute the slopes to feed in to the smoothness regularization term $R_{slope}$. For example, the polarized SGM engine 120 can use a trained neural network to compute the slopes from the first image 102 and second image 104. Suitable techniques for implementing and training such a neural network are described in U.S. patent application Ser. No. 17/359,326, the entire contents of which are hereby incorporated by reference herein in their entirety.

To generate the disparity map D 122, the polarized SGM engine 120 can use any suitable optimization algorithms including, e.g., dynamic programming (DP), tree based DP, graph cuts, belief propagation, and so on, to determine, e.g. in an iterative manner, the value of the disparity $d_p$ for each pixel p in the first image (or disparity $d_q$ for each pixel q in the second image) that minimizes the energy function E(D). Collectively, the disparities $d_p$ or $d_q$ having the final determined values define the disparity map D 122.

The computer vision system 100 can also include one or more components that make use of the disparity map 122 for a variety of purposes or applications. One example of such component is a 3-D reconstruction engine 130, which uses information about the correspondences between stereo pairs of first and second images 102 and 104 defined (e.g., in terms of horizontal offset) by the disparity map 122 to generate a reconstructed 3-D scene 132 or some other digital representation of the environment. The 3-D reconstruction engine 130 can implement program logic that returns an array of 3-D world point coordinates that reconstruct the scene of the environment from the disparity map 122. For example, the 3-D reconstruction engine 130 can reconstruct the 3-D world coordinates of points corresponding to each pixel from the disparity map 122, where the 3-D world coordinates are defined relative to the optical center of a particular camera module in the polarized stereo camera system.

Another example of such component is a depth map estimation engine, which uses the disparity map 122 to generate, e.g., through triangulation, a depth map that includes a depth (or distance) measurement indicative of a distance between the polarized stereo camera system and the surface depicted by the pixels in an image captured by the polarized stereo camera system. Additional examples of such component include components that implement program logic to generate outputs that identify objects to pick up by one or more robots, identify pick positions for objects by the robots, and/or define collision-free trajectories for the robots from processing the disparity map 122, the reconstructed 3-D scene 132, or both. The system can for example pass an instruction or other control signal to a control system for the one or more robots to cause the robots to perform one or more actions in accordance with the outputs.

Figure 2:
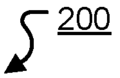
FIG. 2 is a flow diagram of an example process for detect corresponding pixels between the first image and the second image.
Figure 2:
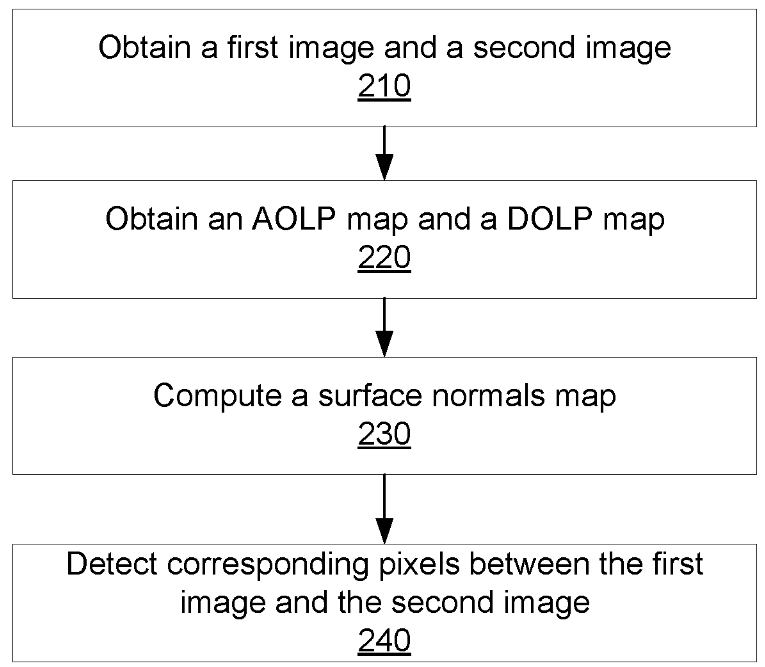

FIG. 2 is a flow diagram of an example process 200 for detect corresponding pixels between the first image and the second image. For convenience, the process 200 will be described as being performed by a system of one or more computers located in one or more locations. For example, an image processing neural network system, e.g., the computer vision system 100 of FIG. 1, appropriately programmed, can perform the process 200.

The system obtains a first polarized stereo image generated at a first position from a first viewpoint and a second polarized stereo image generated at a second position from a second viewpoint (step 210). The first and second images may be captured by using a polarized stereo camera system. The first and second images may be viewed as a stereo pair.

The system obtains an angle of linear polarization (AOLP) map and a degree of linear polarization (DOLP) map each having a field of view overlapping the first image and the second image (step 220). While the remainder of the explanation of process 200 assumes that the AOLP map and the DOLP map are computed from the first viewpoint of the first polarized stereo image, in some cases the system can additionally obtain a second AOLP map and a second DOLP map that are computed from the second viewpoint of the second polarized stereo image. In those cases, the system can additionally perform processes 300 or 400 or both described below with reference to FIG. 3 to enforce a left/right or symmetric consistency between the pair of images.

The system computes a surface normal map based on the AOLP map and the DOLP map and, optionally, additional feature information extracted from the first and second polarized stereo images (step 230). As mentioned above, the system can do so by (i) applying machine learning techniques on the first and second polarized images; (b) applying physics-based Fresnel equations based on the AOLP and DOLP maps, (c) applying machine learning techniques on the AOLP and DOLP maps, or some combination of these.

The system detects corresponding pixels between the first image and the second image by computing a disparity map that optimizes, i.e., minimizes, an energy function (step 240). The disparity map is a digital representation that indicates a disparity between the first polarized stereo image and the second polarized stereo image. Disparity refers to the difference in location (e.g., horizontal coordinates) of corresponding pixels in a pair of images.

In standard semi-global matching (SGM), the energy function contains mainly two terms. One is a pixel matching cost term which measures the pixel similarity and the other is an unpolarized smoothness regularization term that penalizes disparity variations in pixels in a local neighborhood. One difference with standard SGM is that the system additionally uses a polarized smoothness regularization term in an augmented energy function and then computes the disparity map that minimizes the augmented energy function. While the unpolarized smoothness regularization term may be computed based on just the pixels in a local neighborhood, the polarized smoothness regularization term, which is dependent on the slopes of the surfaces in the scene captured by the first and second images, will be computed by the system based on (i) pixels in the local neighborhood and (ii) the surface normal map, as described above.

When included in the augmented energy function, the polarized smoothness regularization term and the unpolarized smoothness regularization term can be differently weighted, e.g., based on whether a surface in the scene is fronto-parallel or not. In some implementations, the polarized smoothness regularization term and the unpolarized smoothness regularization term can be complementarily weighted based on the DOLP map. In other words, the weighting can be determined based on how strong the polarization cue is, so that the regularization term will be a dependent on the DOLP map. This weighting could be performed because the accuracy of the slope estimate depends on obliqueness of angle of surface to optical axis of the camera, and DOLP is a good proxy for the angle (obliqueness).

In some other implementations, the polarized smoothness regularization term and the unpolarized smoothness regularization term are complementarily weighted based on computing a difference in slope between the slope map and a fronto-parallel plane with respect to the first viewpoint. For example, the weighting term can be based on how "strong" the polarization cue is. Thus, the polarized smoothness the regularization term becomes dependent on DOLP. As another example, the weighting term can be defined by a hyperparameter the value of which can be predetermined based on the slope difference.

As a particular example of this, the augmented energy function can have the form below:

$$E(D) = \sum_p C_p(d_p) + \lambda \sum_{p,q \in N} R(p, d_p, q, d_q) + (1-\lambda) \sum_{p,q \in N} R_{slope}(p, d_p, q, d_q),$$

where $\lambda$ is the weighting term.

Figure 3:
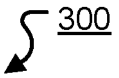
FIG. 3 is a flow diagram of an example process for performing a surface normal consistency check between surface normal maps computed from different viewpoints.
Figure 3:
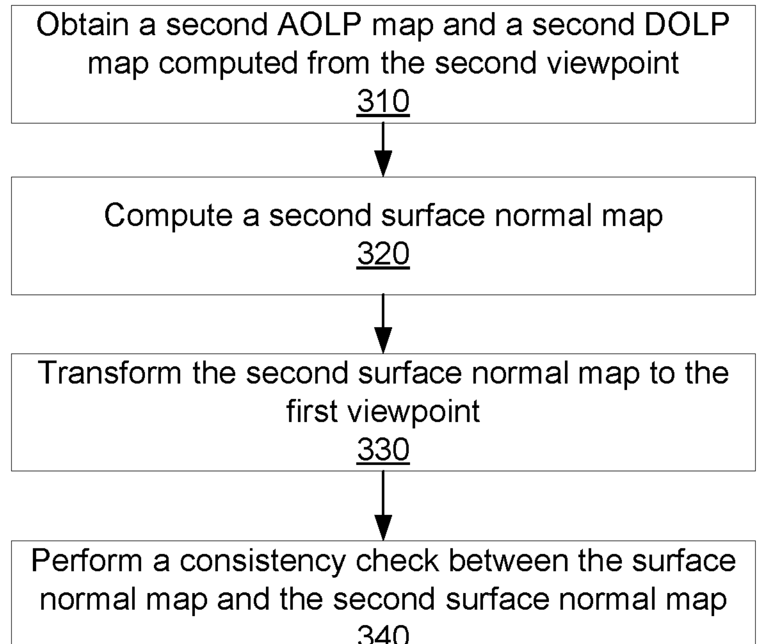

FIG. 3 is a flow diagram of an example process 300 for performing a surface normal consistency check between surface normal maps computed from different viewpoints. For convenience, the process 300 will be described as being performed by a system of one or more computers located in one or more locations. For example, an image processing neural network system, e.g., the computer vision system 100 of FIG. 1, appropriately programmed, can perform the process 300.

The system obtains a second angle of linear polarization (AOLP) map and a second degree of linear polarization (DOLP) map (step 310). The second ALOP map and the second DOLP map are computed from the second viewpoint of the second polarized stereo image in the stereo pair of images obtained at step 210 of process 200.

Like how the surface normal map is computed at step 230 of process 200, the system computes a second surface normal map based on the second AOLP map and the second DOLP map (step 320).

The system transforms the second surface normal map to the first viewpoint in accordance with (i) the second AOLP map and (ii) the disparity map obtained from process 200 to compute a transformed second surface normal map (step 330). In some implementations, this can involve calculating a transformation matrix and using (an inverse transpose of) the matrix to transform the surface normals in the second surface normal map from a coordinate space of the second surface normal map to a different coordinate space of the first surface normal map. In accordance with geometric principles of camera projection, the transformation matrix can be a camera projection matrix of extrinsic parameters that define the rotation and translation between the first and second cameras.

The system performs a surface normals consistency check between the surface normal map and the second surface normal map by computing a difference between the surface normal map and the transformed second surface normal map (step 340). In general, the surface normals consistency check can be performed to generate a refined surface normal map which when used to compute the polarized smoothness regularization term in the augmented energy function can result in a more accurate disparity map for pixels in the first image and the second image. In some implementations, this can involve computing:

$$n_l = f(n_r, \theta_{cal}, d),$$

where f represents Fresnel equations that are viewpoint dependent, $n_l$ and $n_r$ represent the surface normals (n) computed from the first (left) and second (right) viewpoints, respectively, d is a disparity estimate, and $\theta_{cal}$ is an abstraction of physical parameters that map polarization to a normal. Such an abstraction includes, but is not limited to, refractive index n and ambiguity maps.

Figure 4:
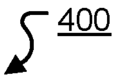
FIG. 4 is a flow diagram of an example process for performing a polarization consistency check between images captured from different viewpoints Like reference numbers and designations in the various drawings indicate like elements.
Figure 4:
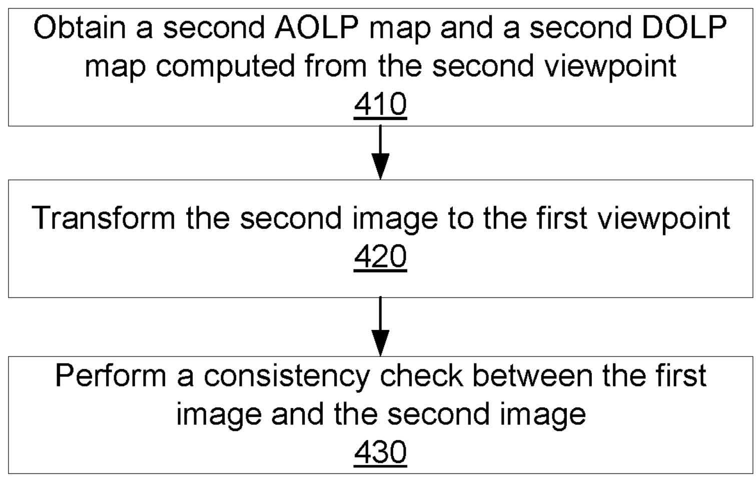

FIG. 4 is a flow diagram of an example process 400 for performing a polarization consistency check between images captured from different viewpoints. For convenience, the process 400 will be described as being performed by a system of one or more computers located in one or more locations. For example, an image processing neural network system, e.g., the computer vision system 100 of FIG. 1, appropriately programmed, can perform the process 400.

The system obtains a second angle of linear polarization (AOLP) map and a second degree of linear polarization (DOLP) map (step 410). The second AOLP map and the second DOLP map are computed from the second viewpoint of the second polarized stereo image in the stereo pair of images obtained at step 210 of process 200.

The system transforms the second image to the first viewpoint in accordance with (i) the second AOLP map and (ii) the disparity map obtained from process 200 to compute a transformed second image (step 420). Like how the second surface normal map can be transformed, in some implementations, this can involve calculating a transformation matrix and using the matrix to transform the pixels in the second image from a coordinate space of the second image to a different coordinate space of the first image.

The system performs a polarization consistency check between the first image and the second image by computing a difference between the first image and the transformed second image (step 430). The system can then remove any outliers (i.e., any pixel having a disparity value greater than a disparity threshold or any other suitable metric) from the second AOLP map in accordance with the polarization consistency check. The second AOLP map could then be used in left-right consistency check, as an example. In some implementations, this can involve back-calculation of the second (or first) image based on knowledge of the disparities and polarization angles.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining a first image from a first viewpoint of a stereo pair and a second image from a second viewpoint of the stereo pair;

obtaining an angle of linear polarization (AOLP) map and a degree of linear polarization (DOLP) map having a field of view overlapping the first image and the second image;

computing a surface normal map based on the AOLP map and the DOLP map; and detecting corresponding pixels between the first image and the second image by computing a disparity map that minimizes an energy function comprising a pixel matching cost term and a polarized smoothness regularization term computed based on pixels in a local neighborhood and based on the surface normal map.

Embodiment 2 is the method of embodiment 1, wherein the energy function further comprises an unpolarized smoothness regularization term computed based on the pixels in the local neighborhood.

Embodiment 3 is the method of any one of embodiments 1-2, wherein the polarized smoothness regularization term and the unpolarized smoothness regularization term are complementarily weighted based on the DOLP map.

Embodiment 4 is the method of any one of embodiments 1-2, wherein the polarized smoothness regularization term and the unpolarized smoothness regularization term are complementarily weighted based on computing difference in slope between the slope map and a fronto-parallel plane with respect to the first viewpoint Embodiment 5 is the method of any one of embodiments 1-4, wherein the AOLP map and the DOLP map are computed from the first viewpoint, and wherein the method further comprises:

obtaining a second AOLP map and a second DOLP map computed from the second viewpoint;

computing a second surface normal map based on the second AOLP map and the second DOLP map;

transforming the second surface normal map to the first viewpoint in accordance with the second AOLP map and the disparity map to compute a transformed second surface normal map; and performing a consistency check between the surface normal map and the second surface normal map by computing a difference between the surface normal map and the transformed second surface normal map.

Embodiment 6 is the method of any one of embodiments 1-4, wherein the AOLP map and the DOLP map are computed from the first viewpoint, and wherein the method further comprises:

obtaining a second AOLP map and a second DOLP map captured from the second viewpoint;

transforming the second image to the first viewpoint in accordance with the second AOLP map and the disparity map to compute a transformed second image; and performing a polarization consistency check between the first image and the second image by computing a difference between the first image and the transformed second image.

Embodiment 7 is the method of embodiment 6, further comprising removing outliers from the second AOLP map in accordance with the polarization consistency check.

Embodiment 8 is a system comprising one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:

obtaining a first image from a first viewpoint of a stereo pair and a second image from a second viewpoint of the stereo pair;

obtaining an angle of linear polarization (AOLP) map and a degree of linear polarization (DOLP) map having a field of view overlapping the first image and the second image;

computing a surface normal map based on the AOLP map and the DOLP map; and detecting corresponding pixels between the first image and the second image by computing a disparity map that minimizes an energy function comprising a pixel matching cost term and a polarized smoothness regularization term computed based on pixels in a local neighborhood and based on the surface normal map.

2. The method of claim 1, wherein the energy function further comprises an unpolarized smoothness regularization term computed based on the pixels in the local neighborhood.

3. The method of claim 2, wherein the polarized smoothness regularization term and the unpolarized smoothness regularization term are complementarily weighted based on the DOLP map.

4. The method of claim 2, wherein the polarized smoothness regularization term and the unpolarized smoothness regularization term are complementarily weighted based on computing difference in slope between a slope map and a fronto-parallel plane with respect to the first viewpoint.

5. The method of claim 1, wherein the AOLP map and the DOLP map are computed from the first viewpoint, and wherein the method further comprises:

obtaining a second AOLP map and a second DOLP map computed from the second viewpoint;

computing a second surface normal map based on the second AOLP map and the second DOLP map;

transforming the second surface normal map to the first viewpoint in accordance with the second AOLP map and the disparity map to compute a transformed second surface normal map; and performing a consistency check between the surface normal map and the second surface normal map by computing a difference between the surface normal map and the transformed second surface normal map.

6. The method of claim 1, wherein the AOLP map and the DOLP map are computed from the first viewpoint, and wherein the method further comprises:

obtaining a second AOLP map and a second DOLP map captured from the second viewpoint;

transforming the second image to the first viewpoint in accordance with the second AOLP map and the disparity map to compute a transformed second image; and performing a polarization consistency check between the first image and the second image by computing a difference between the first image and the transformed second image.

7. The method of claim 6, further comprising removing outliers from the second AOLP map in accordance with the polarization consistency check.

8. A system comprising one or more computers and one or more storage devices storing instructions that are operable, when executed by the one or more computers, to cause the one or more computers to perform operations comprising:

obtaining a first image from a first viewpoint of a stereo pair and a second image from a second viewpoint of the stereo pair;

obtaining an angle of linear polarization (AOLP) map and a degree of linear polarization (DOLP) map having a field of view overlapping the first image and the second image;

computing a surface normal map based on the AOLP map and the DOLP map; and detecting corresponding pixels between the first image and the second image by computing a disparity map that minimizes an energy function comprising a pixel matching cost term and a polarized smoothness regularization term computed based on pixels in a local neighborhood and based on the surface normal map.

9. The system of claim 8, wherein the energy function further comprises an unpolarized smoothness regularization term computed based on the pixels in the local neighborhood.

10. The system of claim 9, wherein the polarized smoothness regularization term and the unpolarized smoothness regularization term are complementarily weighted based on the DOLP map.

11. The system of claim 9, wherein the polarized smoothness regularization term and the unpolarized smoothness regularization term are complementarily weighted based on computing difference in slope between a slope map and a fronto-parallel plane with respect to the first viewpoint.

12. The system of claim 8, wherein the AOLP map and the DOLP map are computed from the first viewpoint, and wherein the method further comprises:

obtaining a second AOLP map and a second DOLP map computed from the second viewpoint;

computing a second surface normal map based on the second AOLP map and the second DOLP map;

transforming the second surface normal map to the first viewpoint in accordance with the second AOLP map and the disparity map to compute a transformed second surface normal map; and performing a consistency check between the surface normal map and the second surface normal map by computing a difference between the surface normal map and the transformed second surface normal map.

13. The system of claim 8, wherein the AOLP map and the DOLP map are computed from the first viewpoint, and wherein the method further comprises:

obtaining a second AOLP map and a second DOLP map captured from the second viewpoint;

transforming the second image to the first viewpoint in accordance with the second AOLP map and the disparity map to compute a transformed second image; and performing a polarization consistency check between the first image and the second image by computing a difference between the first image and the transformed second image.

14. The system of claim 13, further comprising removing outliers from the second AOLP map in accordance with the polarization consistency check.

15. A non-transitory computer storage medium encoded with a computer program, the program comprising instructions that are operable, when executed by data processing apparatus, to cause the data processing apparatus to perform operations comprising:

obtaining a first image from a first viewpoint of a stereo pair and a second image from a second viewpoint of the stereo pair;

obtaining an angle of linear polarization (AOLP) map and a degree of linear polarization (DOLP) map having a field of view overlapping the first image and the second image;

computing a surface normal map based on the AOLP map and the DOLP map; and detecting corresponding pixels between the first image and the second image by computing a disparity map that minimizes an energy function comprising a pixel matching cost term and a polarized smoothness regularization term computed based on pixels in a local neighborhood and based on the surface normal map.

16. The non-transitory computer storage medium of claim 15, wherein the energy function further comprises an unpolarized smoothness regularization term computed based on the pixels in the local neighborhood.

17. The non-transitory computer storage medium of claim 16, wherein the polarized smoothness regularization term and the unpolarized smoothness regularization term are complementarily weighted based on the DOLP map.

18. The non-transitory computer storage medium of claim 17, wherein the polarized smoothness regularization term and the unpolarized smoothness regularization term are complementarily weighted based on computing difference in slope between a slope map and a fronto-parallel plane with respect to the first viewpoint.

19. The non-transitory computer storage medium of claim 15, wherein the AOLP map and the DOLP map are computed from the first viewpoint, and wherein the method further comprises:

obtaining a second AOLP map and a second DOLP map computed from the second viewpoint;

computing a second surface normal map based on the second AOLP map and the second DOLP map;

transforming the second surface normal map to the first viewpoint in accordance with the second AOLP map and the disparity map to compute a transformed second surface normal map; and performing a consistency check between the surface normal map and the second surface normal map by computing a difference between the surface normal map and the transformed second surface normal map.

20. The non-transitory computer storage medium of claim 15, wherein the AOLP map and the DOLP map are computed from the first viewpoint, and wherein the method further comprises:

obtaining a second AOLP map and a second DOLP map captured from the second viewpoint;

transforming the second image to the first viewpoint in accordance with the second AOLP map and the disparity map to compute a transformed second image; and performing a polarization consistency check between the first image and the second image by computing a difference between the first image and the transformed second image.

* * * * *